Feb. 17, 1942.                H. S. JANDUS                2,273,523
                         FENDER SHIELD CONSTRUCTION
                         Filed Oct. 28, 1940        2 Sheets-Sheet 1
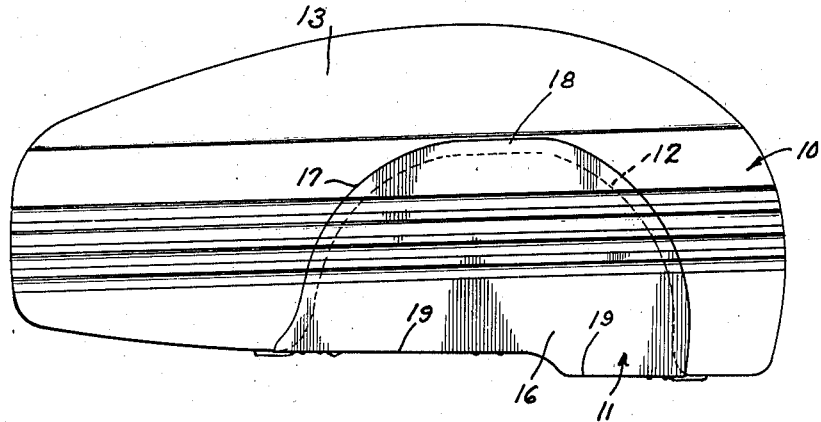
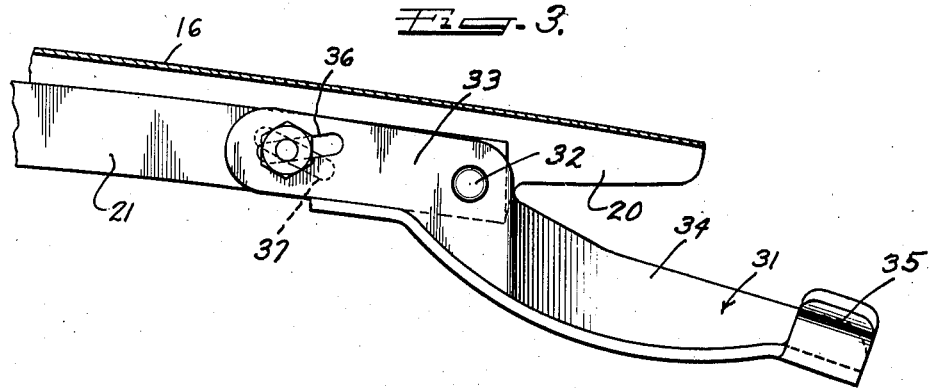
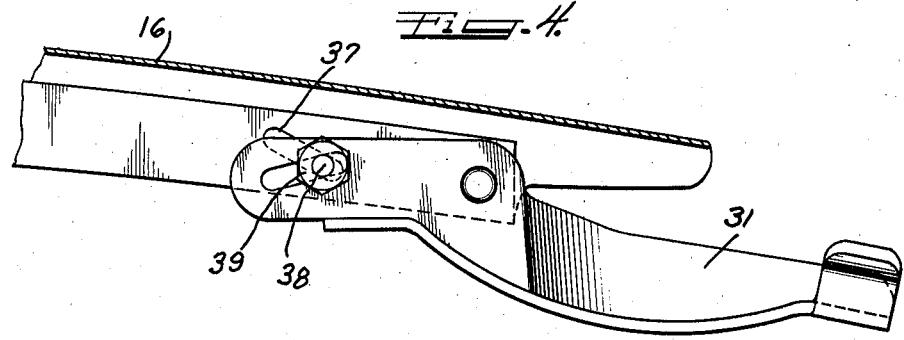
Inventor
Herbert S. Jandus.
by
Charles Hell
Attys.

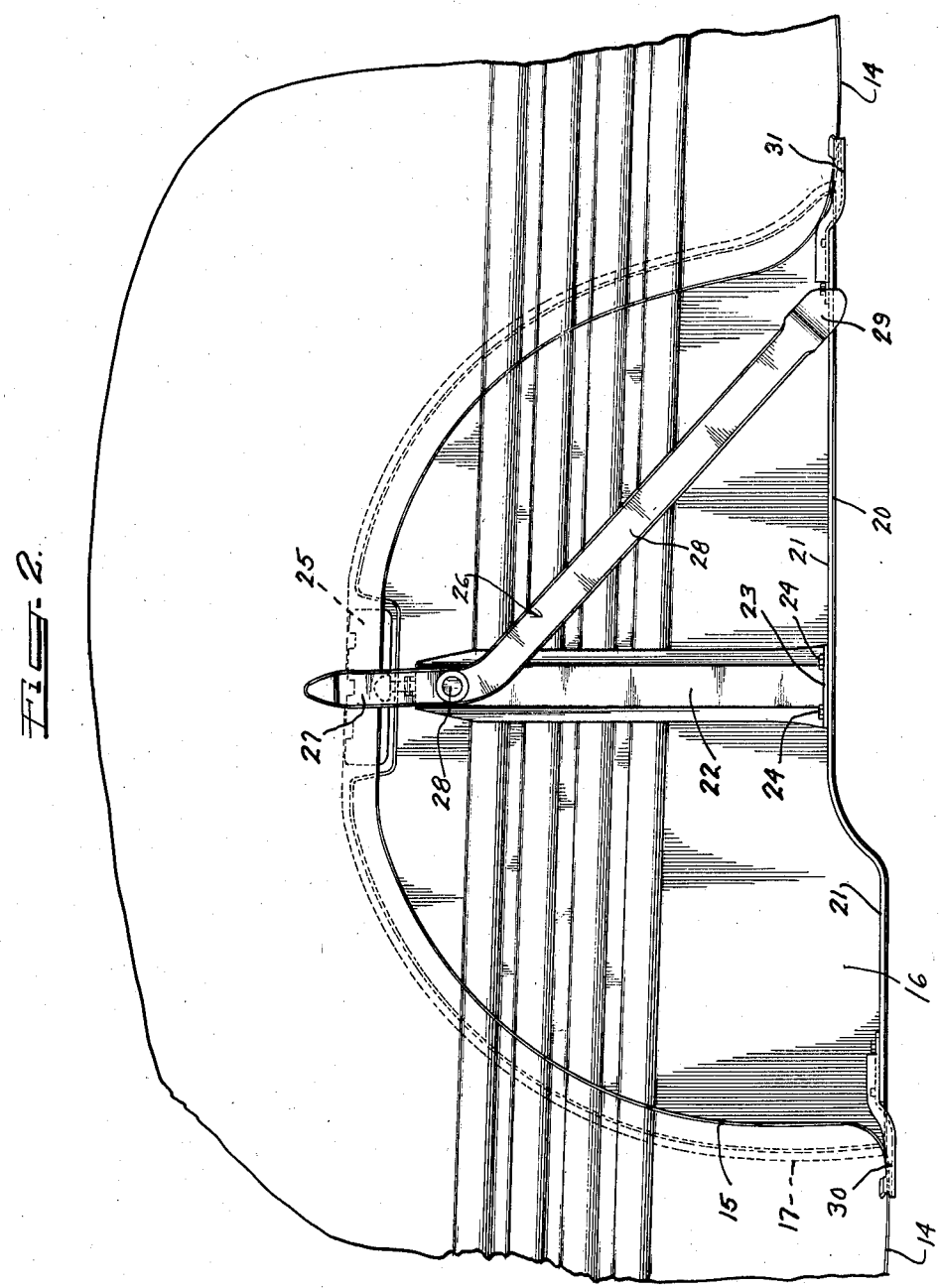

Patented Feb. 17, 1942

2,273,523

UNITED STATES PATENT OFFICE 2,273,523

FENDER SHIELD CONSTRUCTION

Herbert S. Jandus, Detroit, Mich., assignor to Houdaille-Hershey Corporation, Detroit, Mich., a corporation of Michigan Application October 28, 1940, Serial No. 363,094

1 Claim. (Cl. 280—153)

This invention relates to fender shields and fender shield assembly, and more particularly to a fender shield having novel adjustable mounting means thereon for detachably securing the fender shield to the fender.

In the vehicle industry, and particularly in the automobile industry, various means have been utilized to improve the appearance of vehicle fenders. The usual vehicle fender is provided with an opening which affords access to the vehicle wheel, and which permits the ready removal of the wheel in an axial direction. Since this opening inherently presents an ugly outward appearance, detachable fender shields have been employed to substantially cover this opening.

As the term "fender shield" shall hereinafter be employed, it refers to any member which is adapted to be secured to a fender or other portion of a vehicle body for the purpose of covering the opening in the fender or vehicle body which is provided for access to or removal of a vehicle wheel. Furthermore, as the term "fender" shall hereinafter be employed, it refers to any form of wheel fender in its broad sense, whether such fender be separate from the vehicle body part, partly separate from the vehicle body part, or actually an integral part of the vehicle body, and whether or not it projects outwardly away from the principal body portion of the vehicle.

It is an object of the present invention to provide a fender shield of novel construction and characteristics.

It is a further object of this invention to provide a fender shield which is economical to manufacture and which is rugged and reliable in use.

It is a still further object of the present invention to provide novel mounting means for detachably securing a fender shield to a fender.

Another object of this invention is to provide a fender shield having supporting arms at the two lower corners thereof which supporting arms are pivoted for movement in a horizontal plane and which arms may be adjustably secured at any of a wide variety of positions.

Another and further object of this invention is to provide novel trunnion members for a fender shield and to provide a novel method and means for securing the trunnion member to the fender shield.

The novel features which I believe to be characteristic of my invention are set forth in particularity in the appended claim. My invention itself, however, both as to its organization and manner of construction, together with further objects and advantages thereof, may best be understood by reference to the accompanying drawings, in which:

Figure 1 is a front elevational view of a vehicle fender and fender shield assembly;

Figure 2 is an enlarged rear elevational view of the fender and fender shield assembly, shown in Figure 1;

Figure 3 is an enlarged fragmentary sectional view of the lower rear corner of the fender shield shown in Figure 2 and looking down on the trunnion member or supporting arm; and, Figure 4 is a view similar to Figure 3 but showing the supporting arm in a different adjusted position.

Referring now to the various figures of the drawings which illustrates one embodiment of the present invention, there is illustrated therein a vehicle fender 10 having a fender shield 11 mounted thereon over the wheel access opening 12 in the outer depending side wall 13 of the fender 10. While the fender 10 may assume a wide variety of shapes without departing from the spirit and scope of the present invention, and may, indeed be formed integral and made a part of the body itself (not shown), the fender 10 has been illustrated as being of a high crowned type which is employed on one of the conventional motor vehicles of the present day.

The fender shield 11 is detachably mounted on the vehicle fender 10 and is positioned to cover the relatively large opening 12 in the outer side wall 13 of the fender 10 which is conventionally provided in substantially all vehicle fenders to permit access to and removal of the vehicle wheel therethrough. The fender 10 is provided with a bent back flange along its base portion as at 14 and around the opening 12 as at 15. These flange portions 14 and 15 of the fender 10 stiffen the fender in a manner well known to those skilled in the art.

The fender shield 11 comprises a panel portion 16 which has a rolled curved edge 17 which is arranged to overlap the opening 12 in the fender 10 and be seated thereon. The top portion of the fender shield 11 has a straight portion 18 as is clearly shown in Figure 1. The edge portion 17 of the fender shield 11 including the straight portion 18 may if desired be provided with a suitable cushioning element (not shown) to prevent a direct metal to metal contact between the fender shield and the fender.

The lower edge 19 of the fender shield 11 is formed in this particular embodiment of the invention with a configuration as shown in Figures 1 and 2. The lower edge 19 is provided with a rearwardly extending stiffening flange 20 which is preferably reinforced by a flat bar 21 which is bent to follow the varying shape of the lower edge of the fender shield 11.

To further reinforce the fender shield 11, a brace bar 22 extends upwardly behind the panel portion 16 from the lower edge 20 to a point in proximity to the top of the fender shield 11. This brace bar 22 has a base portion 23 which is seated on the reinforcing bar 21 and which is riveted or bolted thereto as at 24. In order that the brace bar 22 may possess sufficient rigidity without undue amount of metal being formed therein, it is preferably channel shaped in cross-section. Mounted on the top of the brace bar 22 is a vertically adjustable plate member 25 which extends up into and against the curled edge portion 17 of the fender shield 11.

The novel features of this brace bar and a novel manner in which it may be secured to the fender shield 11 are described in detail and claimed in my copending application entitled "Fender shield and mounting means therefor," United States Serial No. 271,915, filed May 5, 1939, and assigned to the same assignee as the present invention.

Mounted on the reinforcing or strut member 22 is a latching arm 26 which includes a short leg portion 27 and a relatively long leg portion 28 disposed at an angle with respect to the short leg portion 27. The latching arm 26 may be conveniently mounted in the strut 22 by a mounting stud or rivet 28 carried by the strut 22. The short leg portion 27 of the latching arm 26 is shaped to engage the rearwardly bent flange 15 of the fender 10 at the top of the opening 12.

The long leg portion 28 of the latching arm 26 extends downwardly to the flange 20 and bar 21 and its lower end 29 is bent to rest on the top of the bar 21 and extends down past the flange 20, as described in detail in my copending application referred to above.

The bottom of the fender shield 11 is provided with two trunnion members or support arms 30 and 31, by means of which the fender shield 11 is supported on the rearwardly projecting flange 14 of the fender 10. These trunnion members or supporting arms 30 and 31 are pivotally mounted on the bar 21 and the base flanges 19 and 20 by means of a pin or rivet 32. It is to be understood that this mounting of the support arms 30 and 31 by means of the pin or rivet 32 is of such a nature as to permit limited pivoted movement about the pin 32. Each of the supporting arms 30 and 31 include a tail portion 33, a body portion 34, and a bent ear 35, which ear 35 provides a U-shaped end portion which is arranged to hook around the base edge portion 14 of the fender 10.

The tail portion 33 of each of the arms 30 and 31 has an elongated slot 36 cut therethrough, the longitudinal axis of the slot being disposed at an angle to the longitudinal axis of the bar 21. Immediately below the slot 36 in the tail portion 33 of each of the supporting arms 30 and 31 is a slot 37 cut through the bar 21 and the flange 20 of the fender shield 11. This slot 37 is disposed so that its longitudinal axis is also at an angle with respect to the longitudinal axis of the bar 21 but is arranged to extend in the opposite direction from the longitudinal axis of the bar 21 than does the slot 36. This provides a pair of slots whose longitudinal axes intersect. A bolt 38 passes through both slots 36 and 37 and has threaded on its end a nut 39 which may be tightened to hold the arm in desired adjusted position.

From an inspection of Figures 3 and 4 of the drawings it will be observed that by loosening the nut 39 the arm 31 may be moved in a plane at right angles to the panel 16 to a limited extent. More specifically, when the nut 39 is loosened the arm 31 may be moved so that the hook-shaped end portion 35 is moved toward the panel 16, while the tail portion 33 moves away from the panel 16 about the pivot pin 32. Due to the fact that the slots 36 and 37 are disposed to intersect each other, it will be observed that as the tail portion 33 is moving, the bolt 38 slides to the right in both slots 36 and 37, as viewed in Figures 3 and 4 of the drawings. When the arm 31 has been moved to its desired position, the nut 39 may be tightened and the arm 31 will thereupon be firmly fixed in place on the fender shield 11.

The arm 30 is adjusted in the same manner as the arm 31 above described.

This provision of an adjustable arm for supporting the fender shield 11 has been found to be extremely desirable due to the fact that there is some variation in the exact shapes and sizes of fenders, as well as fender shields, coming off any factory production line. Since it is extremely important that a fender shield be tightly held in place on the fender to prevent vibration and noise, it will at once be perceived that the provision of a supporting arm, which is adjustable to a large number of positions with respect to the distance that the hook-shaped end of the arm is disposed from the panel 16, is extremely desirable.

The fender shield 11 is preferably formed so that before it is mounted on the fender 10, the edges at the front and rear are less convex than the sides of the fender, and the edge of the central portion of the top is more convex than the side of the fender. With the fender shield panel 16 shaped in this manner, it is found that when the trunnion members or supporting arms 30 and 31 are hooked onto the flange 14 at the bottom of the fender 10, and the panel 16 is swung up into position against the side of the fender, a tight contact between the edge of the fender shield panel and the fender is first made at the ends of the fender shield near the bottom, while the top of the panel is still spaced out from the side of the fender. As the top of the fender shield is pressed into position, the fender shield panel 16 is sprung or strained slightly, and the distance along which the edge of the fender is in tight contact with the fender 10 extends up at each end of the fender shield until the entire top edge of the fender shield is in tight contact therewith.

The latching arm 26 may then be swung to move the short leg 27 into latching engagement with the turned back edge 15 of the fender 10. This warping or progressive forcing of the fender shield into place on the fender provides a very tight and snug engagement between the fender shield and fender and forms a mounting which is substantially free from vibration and noise.

While I have shown a particular embodiment of my invention, it will, of course, be understood that I do not wish to be limited thereto, since many modifications may be made, and I, therefore, contemplate by the appended claim to cover all such modifications as fall within the true spirit and scope of my invention.

I claim as my invention:

In a fender shield comprising a panel adapted to cover the wheel access opening in a fender having a shoulder on an inner face thereof, said panel having a substantially horizontal flange near its lower edge, a reinforcing bar secured to said horizontal flange, means for supporting said fender shield on said fender including an arm having an end thereof formed into a hook adapted to fit around behind and over said shoulder on said fender, an upright pin on said bar upon which said arm is pivotally mounted, said arm having a tail portion overlying said bar and seated thereon, said bar and said tail portion of said arm each having an elongated slot therein disposed at an angle with respect to the longitudinal axis of said bar and at an intersecting angle with respect to each other, different portions of said slots being in registry when said arm is in different angular positions with respect to said bar, and releasable clamping means passing through said slots for clamping said arm to said bar at a desired point of registry of the slots of said bar and said arm.

HERBERT S. JANDUS.